3,217,024
CONVERSION OF MIXTURES OF 2,4- AND 2,6-TOLUENE DIISOCYANATES TO OTHER MIXTURES OF DIFFERENT ISOMER RATIO
Jong Chul Park, Buffalo, and Eugene B. Recla, Hamburg, N.Y., and James T. Polley, Glen Dale, W. Va., assignors to Allied Chemical Corporation, New York, N.Y., a corporation of New York
No Drawing. Filed Mar. 22, 1963, Ser. No. 267,320
11 Claims. (Cl. 260—453)

This invention relates to the treatment of mixtures of 2,4- and 2,6-toluene diisocyanates and more particularly refers to a new and improved method for converting said mixtures to other mixtures of different isomer ratio.

Mixtures of 2,4- and 2,6-toluene diisocyanate as well as pure 2,4-toluene diisocyanate are valuable precursors of commercially important polyurethane resins. The reactivity of the 2,4-isomer is greater than that of the 2,6-isomer so that different mixtures of 2,4- and 2,6-toluene diisocyanate have substantially different properties. This difference in reactivity of the isomeric toluene diisocyanate mixtures has permitted the art to utilize polyesters of varying degree of branching and thus to obtain urethane polymers of varying properties. (Rubber Chem. & Technology, 33, p. 1316 (1960).)

Three important commercial toluene diisocyanate products are a mixture of 80±2% by weight of 2,4-toluene diisocyanate and 20±2% by weight of 2,6-toluene diisocyanate; a mixture of 65±3% by weight of 2,4-toluene diisocyanate and 35±3% by weight of 2,6-toluene diisocyanate; and substantially pure 2,4-toluene diisocyanate containing less than about 2.5% by weight of the 2,6-isomer. These toluene diisocyanates are designated in the industry by the numerals "80," "65" and "100," respectively.

The mixture most widely used is an 80:20 mixture of the 2:4 and 2:6 isomers and this mixture is manufactured and generally offered for sale in the United States. The other toluene diisocyanates namely the "65" and "100" sold in much smaller quantities can be prepared by first preparing pure diamines as starting materials, manufacturing the pure 2,4- and 2,6-toluene diisocyanates and then blending them in the desired proportion. This procedure is complicated involving considerable additional equipment and results in a more costly end product.

An object of the present invention is to provide a convenient and economical method for converting a mixture of 2,4- and 2,6-toluene diisocyanates to other mixtures of different isomer ratio. Another object of the present invention is to provide a method for converting a mixture of 2,4- and 2,6-toluene diisocyanate containing about 70–90% by weight 2,4-toluene diisocyanate the balance being substantially 2,6-toluene diisocyanate to a mixture of 65±3% by weight 2,4-toluene diisocyanate and 35±3% by weight 2,6-toluene diisocyanate and substantially pure 2,4-toluene diisocyanate containing less than about 2.5% by weight of 2,6-toluene diisocyanate. A still further object of the present invention is to provide an effective method for obtaining "100," i.e. 2,4-toluene diisocyanate containing less than about 2.5% by weight of the 2,6-isomer, from a mixture of 90–94% by weight of 2,4-toluene diisocyanate and 6–10% by weight of 2,6-toluene diisocyanate. Other objects and advantages will be apparent from the following description.

Separation of 2,4-toluene diisocyanate from mixtures of 2,4-toluene diisocyanate and 2,6-toluene diisocyanate by fractional distillation and solvent extraction were found to be impractical. It is known to cool an agitated molten binary material of organic, isomeric compounds so as to bring about partial crystallization of the mixture and thereby produce crystals of one component and a mother liquor which contains a lower concentration of said component than the original mixture. Unfortunately, however, when mixtures of 2,4- and 2,6-toluene diisocyanate are crystallized according to this procedure so as to obtain as mother liquor a mixture of the isomers, the crystals of the 2,4-isomer produced are of relatively small size. These fine crystals do not form a coherent mass so that a viscous slurry of solid 2,4-toluene diisocyanate in the mother liquor is produced. The separation of the mother liquor is thus rendered difficult due to clogging of the separatory means (filter press, centrifuge, etc.) resulting in long separation times and frequently costly stoppages. Furthermore since a substantial portion of the mother liquor is retained by capillary action in the porous body of crystals, low yields of mother liquor are obtained.

In accordance with the present invention we have directly produced "65" toluene diisocyanate, a mixture of 65±3% by weight of 2,4-toluene diisocyanate and 35±3% by weight of 2,6-toluene diisocyanate from mixtures of 2,4- and 2,6-toluene diisocyanates containing 70–90% by weight of 2,4-toluene diisocyanate the balance being substantially 2,6-toluene diisocyanate by the following steps (A) an induction period wherein said latter mixture of 2,4- and 2,6-toluene diisocyanate is cooled under substantially static conditions without seeding to induce crystallization of 2,4-toluene diisocyanate, (B) a crystallization period wherein cooling is continued under substantially static conditions to dissipate the heat of crystallization of the 2,4-isomer and the temperature of the mixture is brought to about 5–8° C., preferably 6–7° C. under substantially static conditions to form a mixture of mother liquor and a coherent deposit of crystals, (C) a separation period wherein at the above temperature of about 5–8° C., preferably 6–7° C. mother liquor is separated from the coherent crystalline mass, and (D) a heating period wherein the mixture of crystals and adherent mother liquor, preferably during the separation of mother liquor, is heated to 0.5–3° C. above the temperature of the mixture at the commencement of separation of mother liquor desirably at a temperature within the range of 6.5–9.5° C. and adherent liquid is drained from the crystalline mass during heating. The combined fractions of mother liquor separated from the crystalline mass in (C) and adherent liquid separated in (D) is "65" toluene diisocyanate, i.e. it has the desired composition of 65±3% by weight of 2,4-toluene diisocyanate and 35±3% by weight of 2,6-toluene diisocyanate and may be sent to storage as a product of the process. The crystal residue remaining after separation of the mother liquor is converted to "100" 2,4-toluene diisocyanate by the following steps (E) a heating period wherein the mass is heated to a temperature above the melting point of the crystals preferably within the range of about 21–30° C., (F) an induction period wherein the molten mass is cooled under substantially static conditions without seeding to induce crystallization of 2,4-toluene diisocyanate, (G) a crystallization period wherein cooling is continued under substantially static conditions to dissipate the heat of crystallization of the 2,4-isomer and the temperature of the mixture is brought to about 8–11° C., preferably 9–10° C. under substantially static conditions to form a mixture of mother liquor and a coherent deposit of crystals, (H) a separation period wherein at the above temperature of about 8–11° C., preferably 9–10° C., mother liquor is separated from the coherent mass of crystals, (I) a heating period wherein the mixture of crystals and adherent mother liquor is heated, preferably during the separation of mother liquor, to a temperature of 18–21.5° C., preferably about 20–21.5° C., and liquor adhering to the crystals is separated from the crystalline mass in order to remove completely as possible 2,6-isomer which may adhere to the crystals. Heating the mixture to temperatures above about 21.5° C. results in the melting and consequently the loss of pure 2,4-toluene diisocyanate and hence is to be avoided, (J) a heating period wherein the crystal residue is heated to a temperature above its melting point, i.e. about 21.5° C., and recovered as substantially pure 2,4-toluene diisocyanate. The combined liquid fractions separated from the crystals in (H) and (I) may be recycled by blending with fresh starting material to produce additional "65" toluene diisocyanate.

Conversion of mixtures of isomeric toluene diisocyanate according to the present method can be carried out in equipment of simple design and inexpensive construction. Preferably the present process is carried out in a shell-type heat exchange apparatus consisting of an inner crystallization tube surrounded by an outer jacket in which fluid coolant can be circulated.

In carrying out the separation procedure of the present invention to obtain as mother liquor "65" toluene diisocyanate, liquid "80" toluene diisocyanate is cooled under substantially static conditions without seeding to induce crystallization of 2,4-toluene diisocyanate, conveniently from above about 14° C. at a rate which will induce crystallization at a temperature below about 6.5° C., allowing the exothermic crystallization of 2,4-toluene diisocyanate to take place, under substantially static conditions continuing the cooling to dissipate the heat of crystallization of the 2,4-isomer and bringing the temperature of the resulting mixture to about 5–8° C., preferably 6–7° C., i.e. the temperature at which the mother liquor will have about the desired composition (62 to 68% by weight 2,4- and 32 to 38% 2,6-isomer), and at this temperature commencing to drain the mother liquor. An excellent result is obtained by cooling at a rate which induces crystallization at about 3° to 5° C., conveniently accomplished by circulating coolant at about 3° to 5° C.

The mixture of crystals and adherent mother liquor is heated, preferably while draining mother liquor, to a temperature about 0.5 to 3° C. above the temperature at which draining of the mother liquor commenced, preferably within the range of about 6.5° C. to 9.5° C. and adherent liquid is drained from the crystalline mass during heating. Conveniently heating is achieved by replacing the crystallization coolant with air at ambient temperature in the jacket of the heat exchange apparatus.

In isolating "100" toluene diisocyanate according to the present process, the crude 2,4-toluene diisocyanate obtained above as crystal residue from the "65" toluene diisocyanate production and containing about 90–94% by weight of the 2,4-isomer is melted and then cooled under substantially static conditions without seeding to induce crystallization of 2,4-toluene diisocyanate, conveniently from above about 21° C. at a rate so as to induce crystallization at a temperature below about 11° C., allowing the exothermic crystallization of 2,4-toluene diisocyanate to take place, continuing the cooling under substantially static conditions to dissipate the heat of crystallization of the 2,4-isomer and bringing the temperature of the resulting mixture to about 8° to 11° C., preferably about 9° to 10° C., and especially about 10° C. under substantially static conditions, and at this temperature commencing to drain mother liquor.

The mixture of crystals and adherent mother liquor is heated gradually, preferably while draining mother liquor, to a temperature of at least about 18.0° C., preferably about 20.0 to 21.5° C., and liquor adhering to the crystals is drained from the crystalline mass during heating. Conveniently heating is achieved by replacing the crystallization coolant with water at about 19.5 to 21.5° C.

In the following examples which illustrate our invention, parts and percentages, unless otherwise noted, are by weight and temperatures are in degrees centigrade.

EXAMPLE 1

The heat exchange apparatus employed in this example consisted of a vertical circular crystallization tube of stainless steel (gauge BWG 16), 34 by 1⅞ inches internal diameter and 2 inch outside diameter, equipped at the upper end with a gas inlet tube, at the lower end with a 3 x ½ inch nipple containing a Hoke needle valve. The tube was surrounded with a stainless steel jacket affording a ¼ inch clearance between the outer wall of the crystallization tube and the jacket. A thermocouple was employed to read temperatures in the center of the crystallization tube. The entire apparatus was insulated with urethane foam.

At ambient temperature, 1452 parts of "80" toluene diisocyanate (a mixture of 80±2% 2,4-toluene diisocyanate and 20±2% 2,6-toluene diisocyanate) were charged to the crystallization tube. A coolant mixture containing about 80% water and 20% ethylene glycol maintained at about 4° to 5° was circulated through the jacket at an average linear flow rate of about 0.05 foot per second. After a period of about 0.5 hour, the mixture was cooled to about 4.6° and crystallization began. After about 35 minutes heat evolved by crystallization of the 2,4-isomer caused the temperature of the charge to rise to about 8.5°. After about 90 minutes, the mixture had cooled to about 6.5° and the coolant was drained from the jacket. Mother liquor (747.5 parts), was drained from the tube under nitrogen at ambient temperature at 3 lbs. per sq. inch pressure for 85 minutes until the temperature of charge was about 9.6°. Steam was circulated in the jacket to melt the crystalline residue (701 parts) which was drained under nitrogen at ambient temperature and 3 lbs. per sq. inch pressure. The mother liquor and crystal melt collected had the following composition as determined by infrared analysis (ASTM D1638–60T)

| Mother liquor: | Percent |
|---|---|
| 2,4-toluene diisocyanate | 67 |
| 2,6-toluene diisocyanate | 33 |
| Crystal melt: | |
| 2,4-toluene diisocyanate | 95 |
| 2,6-toluene diisocyanate | 5 |

EXAMPLES 2–12

The procedure described in Example 1 was repeated in several experiments in which one or more of the process variables were altered as indicated in Table I. The results of these experiments are also presented in Table I.

Table I

| Example | Crystallization tube | Parts of toluene diisocyanate mixture charged | Ratio of 2,4- to 2,6-toluene diisocyanate in mixture charged | Temperature of coolant (degrees) | Rate of flow of coolant (parts by vol. per minute) | Temperature of mixture at start of crystallization (degrees) | Temperature of mixture at start of draining (degrees) |
|---|---|---|---|---|---|---|---|
| 2 | Same as in Ex. 1 | 1,616 | Same as in Ex. 1 | 4–5 | 1,300 | 4.0 | 6.0 |
| 3 | do | 1,664 | do | 2.8–4.8 | | 3.0 | 6.5 |
| 4 | do | 1,627 | 79/21 | 5–6 | 700 | 5.0 | 6.5 |
| 5 | do | 1,603 | Same as in Ex. 1 | 4–6 | 730 | 4.5 | 6.5 |
| 6 | do | 1,573 | Same as in Ex. 1 but stripped of lights and high boiling compounds. | 3.5–4.8 | 700 | 4.6 | 6.5 |
| 7 | do | 1,553 | Same as in Ex. 6 | 4.0–4.8 | 710 | 4.6 | 6.5 |
| 8 | do | 1,501 | Same as in Ex. 1 | 4.6–4.8 | 700 | 4.7 | 6.5 |
| 9 | do | 1,520 | do | 4.4–5.0 | 250 | 5.0 | 6.5 |
| 10 | 6' x 1⅞" tube | 3,841 | do | 3.2–4.5 | 700 | 4.7 | 6.5 |
| 11 | do | 3,853 | do | 3.6–5.0 | 250 | 5.3 | 6.5 |
| 12 | do | 3,877 | do | 3.5–4.5 | 750 | 4.5 | 6.5 |

| Example | Temperature of mixture at end of draining (degrees) | Temperature and composition of coolant during draining | Drainage rate (parts per min.) | Weight of mother liquor | Weight of crystal residue | Ratio of 2,4- to 2,6-toluene diisocyanate obtained | |
|---|---|---|---|---|---|---|---|
| | | | | | | Mother liquor | Crystal residue |
| 2 | 8.0 | Crystallization coolant at 6–8° | 7.8 | 746 | 830 | 63/37 | 92.5/7.5 |
| 3 | 8.0 | Crystallization coolant at 6.5; ambient air. | 1.09; 6.46 | 792 | 871 | 64.4/35.6 | [1] 91.9 |
| 4 | 10.0 | Crystallization coolant at 6.5 to 7.0; ambient air. | 8.58 4.87 | 816.8 | 812 | 65.2/34.8 | [2] 92.8/7.2 |
| 5 | 9.5 | Ambient air | 9.5 | 789 | 814 | 68/32 | 94/6 |
| 6 | 9.5 | do | 9.0 | 783.9 | 784.6 | 65/35 | 94/6 |
| 7 | 9.6 | do | 10.3 | 769.4 | 783.6 | 65/35 | 94/6 |
| 8 | 9.5 | do | 10.1 | 749.3 | 751.2 | 67/33 | 92/8 |
| 9 | 9.5 | do | 16.1 | 771.9 | 740.5 | 68/32 | 92/8 |
| 10 | 9.5 | do | 16.4 | 1,765 | | 65/35 | |
| 11 | 9.5 | do | 17.2 | 1,794 | 2,054 | 65/35 | |
| 12 | 9.7 | 11.7° tempered water | 46.7 | 1,868 | | 66/34 | |

[1] Portion of mother liquor was drained while the temperature of mixture was maintained at 6.5°; additional mother liquor was drained while allowing the temperature of the charge to rise to 8.0° (ambient air in jacket).

[2] Portion of mother liquor was drained while temperature of mixture was maintained at 6.5–7.0°; additional mother liquor was drained while allowing the temperature of the mixture to rise from 7.0° to 10° (ambient air in jacket).

EXAMPLE 13

To a heat exchange apparatus, which was similar to that of Example 1 except that the internal diameter of the crystallization tube was ⅞", was charged 421 parts of a mixture composed of 91.5% 2,4-toluene diisocyanate and about 8.5% 2,6-toluene diisocyanate. The mixture was continuously cooled by circulation through the jacket of a mixture of about 80% water and 20% ethylene glycol at a temperature of about 3.6 to 4.8° at an average linear flow rate of about 0.05 foot per second. After about 4 minutes, the mixture had cooled to 9.2° and crystallization began. Over a period of about 12 minutes, heat evolved by the crystallization of the 2,4-isomer raised the temperature of the mixture to about 12.8°. After cooling to about 10° over a period of about 18 minutes, the coolant was replaced by tempered water at about 19.5–20.4° circulating at an average linear flow rate of about 0.053 foot per second. Over a period of about 1.5 hours the mother liquor was allowed to drain from the mixture under an atmosphere of nitrogen at a pressure of 2 to 3 lbs. per sq. in. and ambient temperature until the temperature of the contents of the tube rose to about 19.0°. After draining of mother liquor was complete, the crystalline residue was melted by passing steam through the jacket and the molten material was drained from the crystallizer. The mother liquor (245 parts) and the crystal melt (176 parts), which were collected had the following compositions as determined by infrared analysis:

Mother liquor: Percent
2,4-toluene diisocyanate _____ 83
2,6-toluene diisocyanate _____ 17

Crystal melt:
2,4-toluene diisocyanate _____ 99
2,6-toluene diisocyanate _____ 1

EXAMPLES 14–21

The procedure described in Example 13 was repeated in several experiments wherein one or more of the process variables were altered as indicated in the following Table II. The results of these experiments are presented in Table II.

Table II

| Examples | Crystallization tube dimensions | Parts of toluene diisocyanate mixture charged | Ratio of 2,4- to 2,6-toluene diisocyanate in mixture charged | Temperature of Coolant (degrees) | Rate of flow of coolant (parts by vol. per min.) | Temperature of mixture at start of crystalization (degrees) | Temperature of mixture at start of draining (degrees) |
|---|---|---|---|---|---|---|---|
| 14 | Same as in Ex. 1 | 1,617 | 91/9 | 4.0–4.5 | 750 | 12.0 | 9.8 |
| 15 | do | 1,658 | 91/9 | −1.0–+0.5 | 750 | 12.3 | 10.0 |
| 16 | do | 1,650 | 91/9 | 3.5–4.0 | 750 | 11.9 | 10.0 |
| 17 | Same as in Ex. 13 | 436 | 91.5/8.5 | 4.0–5.0 | 750 | 11.7 | 9.3 |
| 18 | do | 432 | 98/2 | 4.0–4.6 | 750 | 14.5 | 11.3 |
| 19 | Same as in Ex. 1 | 1,628 | 91.5/8.5 | 3.8–4.6 | 750 | 9.0 | 10.0 |
| 20 | do | 1,657 | 91.5/8.5 | 3.2–4.7 | 750 | 8.8 | 10.0 |
| 21 | 6' x 1⅞" | 3,834 | 91.5/8.5 | 3.8–4.7 | 750 | 9.5 | 10.0 |

Table II—Continued

| Examples | Temperature of mixture at end of draining (degrees) | Composition and temperature of coolant in jacket during draining | Drainage rate, parts per minutes | Weight of mother liquor | Weight of crystal residue | Ratio of 2,4- to 2,6-toluene diisocyanate obtained | |
|---|---|---|---|---|---|---|---|
| | | | | | | Mother liquor | Crystal residue |
| 14 | 21.3 | Ambient air | 1.42 | 152 | 865 | 83/17 | 99/1 |
| 15 | 21.5 | ---do--- | 1.16 | 946.2 | 709.4 | 86/14 | 98/2 |
| 16 | 21.5 | ---do--- | 0.925 | 795 | 855 | 83/17 | ¹ 98/2 |
| 17 | 21.0 | ---do--- | 0.498 | 272.8 | 163 | 86/14 | 99/1 |
| 18 | 20.5 | Tempered water of 21.3° | 7.8 | 57.7 | 374 | | 100/0 |
| 19 | 19.0 | Tempered water of 19.5° | 3.12 | 791.4 | 832 | | 97.9/2.1 |
| 20 | 20.5 | Tempered water of 21.5° | 2.79 | 970 | 686.3 | | 99/1 |
| 21 | 20.5 | ---do--- | 6.58 | 2,300 | 1,534 | | 98.9/1.1 |

¹ Crystallization coolant was about 90% water, 10% ethylene glycol.

It can thus be seen that an improved process has been devised for converting a mixture of 2,4- and 2,6-toluene diisocyanates containing about 70–90% by weight of 2,4-toluene diisocyanate the balance being substantially 2,6-toluene diisocyanate to a mixture of 65±3% by weight 2,4- and 35±3% by weight 2,6-toluene diisocyanate and substantially pure 2,4-toluene diisocryanate containing less than about 2.5% by weight, 2,6-toluene diisocyanate. As will be evident to those skilled in the art, the invention is not limited to the details of the foregoing purely illustrative examples and that changes can be made without departing from the scope or spirit of the invention.

The mixtures of 2,4- and 2,6-toluene diisocyanate which are employed as starting materials in the present process should contain at least about 70% and preferably 80±2% by weight of the 2,4-isomer. Mixtures of 2,4- and 2,6-toluene diisocyanate of normal commercial purity (i.e. containing at least about 99% by weight toluene diisocyanates) are used as starting materials.

The mother liquors which are obtained according to the present process can be separated from the crystalline mass by any suitable means which will not substantially disrupt, e.g. by attrition, the coherent mass of 2,4-toluene diisocyanate crystals, according to the preferred mode of operation, mother liquor is separated by draining under nitrogen at ambient temperature and a pressure of about at 2 to 3 lbs. per sq. inch.

The coolant employed in crystallization according to the process of the instant invention may be any commercial fluid refrigerant suitable for cooling over the range of 0° C. to ambient temperature. For example, mixture of 80% by weight water and 20% by weight ethylene glycol; a mixture of 90% by weight water and 10% by weight ethylene glycol; water; Genetron 113 ($CCl_2F$—$CClF_2$) and ethylene glycol. Preferably a mixture containing about 80% by weight of water and about 20% by weight ethylene glycol is employed as coolant.

We claim:

1. A process for the conversion of mixtures of 2,4- and 2,6-toluene diisocyanates containing about 70–90% by weight of 2,4-toluene diisocyanate, the balance being substantially 2,6-toluene diisocyanate, to a mixture of 65±3% by weight of 2,4-toluene diisocyanate and 35±3% by weight of 2,6-toluene diisocyanate and substantially pure 2,4-toluene diisocyanate containing less than about 2.5% by weight of the 2,6-isomer, which comprises (A) cooling the mixture of 2,4- and 2,6-toluene diisocyanates containing 70–90% by weight of 2,4-toluene diisocyanate under substantially static conditions to induce crystallization of 2,4-toluene diisocyanate, (B) continuing cooling under substantially static conditions to dissipate the heat of crystallization of the 2,4-isomer and bringing the temperature of the mixture to about 5–8° C. under substantially static conditions to form a mixture of mother liquor and a coherent deposit of crystals, (C) at this temperature separating mother liquor from the coherent crystalline mass, (D) heating the mixture of crystals and adherent mother liquor to about 0.5–3° C. above the temperature at the commencement of the separation of mother liquor and separating adherent liquid from the crystalline mass during heating, the combined liquid fractions of (C) and (D) having the composition of 65±3% by weight of 2,4-toluene diisocyanate and 35±3% by weight of 2,6-toluene diisocyanate, (E) heating the residual crystals to a temperature above the melting point of the crystals, (F) cooling the molten mass under substantially static conditions to induce crystallization of 2,4-toluene diisocyanate, (G) continuing cooling under substantially static conditions to dissipate the heat of crystallization of the 2,4-isomer and bringing the temperature of the mixture to about 8–11° C. under substantially static conditions to form a mixture of mother liquor and a coherent deposit of crystals, (H) at this temperature separating mother liquor from the coherent mass of crystals, (I) heating the mixture of crystals and adherent mother liquor to a temperature of about 18–21.5° C. and separating adherent liquid from the crystalline mass during heating and (J) recovering substantially pure 2,4-toluene diisocryanate remaining as a crystalline mass.

2. A process for the conversion of mixtures of 2,4- and 2,6-toluene diisocyanates containing about 70–90% by weight of 2,4-toluene diisocyanate the balance being substantially 2,6-toluene diisocyanate to a mixture of 65±3% by weight of 2,4-toluene diisocyanate and 35±3% by weight of 2,6-toluene diisocyanate and substantially pure 2,4-toluene diisocyanate containing less than about 2.5% by weight of the 2,6-isomer which comprises (A) cooling the mixture of 2,4- and 2,6-toluene diisocyanates containing 70–90% by weight of 2,4-toluene diisocyanate under substantially static conditions to induce crystallization of 2,4-toluene diisocyanate, (B) continuing cooling under substantially static conditions to dissipate the heat of crystallization of the 2,4-isomer and bringing the temperature of the mixture to about 6–7° C. under substantially static conditions to form a mixture of mother liquor and a coherent deposit of crystals, (C) at this temperature separating mother liquor from the coherent crystalline mass, (D) heating the mixture of crystals and adherent mother liquor to a temperature above the temperature at the commencement of the separation of mother liquor and within the range of 6.5–9.5° C. and separating adherent liquid from the crystalline mass during heating, the combined liquid fractions of (C) and (D) having the composition of 65±3% by weight of 2,4-toluene diisocyanate and 35±3% by weight of 2,6-toluene diisocyanate, (E) heating the residual crystals to a temperature within the range of about 21–30° C. to melt the crystals, (F) cooling the molten mass under substantially static conditions to induce crystallization of 2,4-toluene diisocyanate, (G) continuing cooling under substantially static conditions to dissipate the heat of crystallization of the 2,4-isomer and bringing the temperature of the mixture to about 9–10° C. under substantially static conditions to form a mixture of mother liquor and a coherent deposit of crystals, (H) at this temperature separating mother liquor from the coherent mass of crystals, (I) heating the mixture of crystals and adherent mother liquor to a temperature of about 20–21.5° C. and separating adherent liquid from the crystalline mass during heating and (J) heating the crystalline mass to a temperature above about 21.5° C. to melt the crystals and recovering the molten mass as substantially pure 2,4-toluene diisocyanate.

3. A process as claimed in claim 1 wherein steps (C) and (D) and steps (H) and (I) are carried out concurrently.

4. A process as claimed in claim 1 wherein the feed mixture of 2,4- and 2,6-toluene diisocyanates contains 80±2% by weight of 2,4-toluene diisocyanate and 20±2% by weight of 2,6-toluene diisocyanate.

5. A process as claimed in claim 1 wherein the liquid fractions separated in steps (H) and (I) are returned and admixed with a feed mixture treated in step (A).

6. A process for the production of a mixture of 65±3% by weight of 2,4-toluene diisocyanate and 35±3% by weight of 2,6-toluene diisocyanate from a mixture of 2,4- and 2,6-toluene diisocyanates containing 70–90% by weight of 2,4-toluene diisocyanate, the balance being substantially 2,6-toluene diisocyanate which comprises (A) cooling the mixture of 2,4- and 2,6-toluene diisocyanates containing 70–90% by weight of 2,4-toluene diisocyanate under substantially static conditions to induce crystallization of 2,4-toluene diisocyanate, (B) continuing cooling under substantially static conditions to dissipate the heat of crystallization of the 2,4-isomer and bringing the temperature of the mixture to about 5–8° C. under substantially static conditions to form a mixture of mother liquor and a coherent deposit of crystals, (C) at this temperature separating mother liquor from the coherent crystalline mass and (D) heating the mixture of crystals and adherent mother liquor to about 0.5–3° C. above the temperature at the commencement of the separation of mother liquor and separating adherent liquid from the crystalline mass during heating, the combined liquid fractions of (C) and (D) having the composition of 65±3% by weight of 2,4-toluene diisocyanate and 35±3% by weight of 2,6-toluene diisocyanate.

7. A process for the production of a mixture of 65±3% by weight of 2,4-toluene diisocyanate and 35±3% by weight of 2,6-toluene diisocyanate from a mixture of 2,4- and 2,6-toluene diisocyanate containing 70–90% by weight of 2,4-toluene diisocyanate, the balance being substantially 2,6-toluene diisocyanate, which comprises (A) cooling the mixture of 2,4- and 2,6-toluene diisocyanates containing 70–90% by weight of 2,4-toluene diisocyanate under substantially static conditions to induce crystallization of 2,4-toluene diisocyanate, (B) continuing cooling under substantially static conditions to dissipate the heat of crystallization of the 2,4-isomer and bringing the temperature of the mixture to about 6–7° C. under substantially static conditions to form a mixture of mother liquor and a coherent deposit of crystals, (C) at this temperature separating mother liquor from the coherent crystalline mass and (D) heating the mixture of crystals and adherent mother liquor to a temperature above the temperature at the commencement of the separation of mother liquor and within the range of 6.5–9.5° C. and separating adherent liquid from the crystalline mass during heating, the combined liquid fractions of (C) and (D) having the composition of 65±3% by weight of 2,4-toluene diisocyanate and 35±3% by weight of 2,6-toluene diisocyanate.

8. A process for the producing of substantially pure 2,4-toluene diisocyanate from a mixture of 2,4- and 2,6-toluene diisocyanates having a composition substantially identical with that of the crystalline residue of claim 1, step (H) which comprises (A) cooling the molten mass of said mixture under substantially static conditions to induce crystallization of 2,4-toluene diisocyanate to take place, (B) continuing cooling under substantially static conditions to dissipate the heat of crystallization of 2,4-isomer and bringing the temperature of the mixture to about 8–11° C. under substantially static conditions to form a mixture of mother liquor and a coherent deposit of crystals, (C) at this temperature separating mother liquor from the coherent mass of crystals, (D) heating the mixture of crystals and adherent mother liquor to a temperature of about 18–21.5° C. and separating adherent liquid from the crystalline mass during heating and (E) recovering substantially pure 2,4-toluene diisocyanate remaining as a crystalline mass.

9. A process for the production of substantially pure 2,4-toluene diisocyanate from a mixture of 90–94% by weight of 2,4-toluene diisocyanate and 6–10% by weight of 2,6-toluene diisocyanate which comprises (A) cooling a molten mass of a mixture of 90–94% by weight of 2,4-toluene diisocyanate and 6–10% by weight of 2,6-toluene diisocyanate under substantially static conditions to induce crystallization of 2,4-toluene diisocyanate, (B) continuing cooling under substantially static conditions to dissipate the heat of crystallization of 2,4-isomer and bringing the temperature of the mixture to about 9–10° C. under substantially static conditions to form a mixture of mother liquor and a coherent deposit of crystals, (C) at this temperature separating mother liquor from the coherent mass of crystals, (D) heating the mixture of crystals and adherent mother liquor to a temperature of about 20–21.5° C. and separating adherent liquid from the crystalline mass during heating, and (E) heating the crystalline mass to a temperature of above about 21.5° C. to melt the crystals and recovering the molten mass as substantially pure 2,4-toluene diisocyanate.

10. A process as claimed in claim 6 wherein steps (C) and (D) are carried out concurrently.

11. A process as claimed in claim 8 wherein steps (C) and (D) are carried out concurrently.

References Cited by the Examiner

Du Pont, September, 1960.
Du Pont, December, 1955.
MacArdle: Use of Solvents in Synthetic Organic Chemistry 1925, New York, D. Van Nostrand Company, pp. 143–157.
Saunders et al.: Polyurethanes, Chemistry and Technology Chemistry, Part I, 1962, pages 347–348.

CHARLES B. PARKER, *Primary Examiner.*